US007925796B1

(12) United States Patent
Bailey et al.

(10) Patent No.: US 7,925,796 B1
(45) Date of Patent: Apr. 12, 2011

(54) METHODS, SYSTEMS, AND COMPUTER PROGRAM PRODUCTS FOR PERFORMING AN INPUT/OUTPUT (I/O) OPERATION THAT INCLUDES A VIRTUAL DRAIN

(75) Inventors: C. Christopher Bailey, Durham, NC (US); Michael L. Burriss, Raleigh, NC (US); Alan L. Taylor, Cary, NC (US); Miles Aram de Forest, Bahama, NC (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/799,847

(22) Filed: May 3, 2007

(51) Int. Cl.
*G06F 13/14* (2006.01)

(52) U.S. Cl. ................. 710/5; 710/39; 710/74; 711/161

(58) Field of Classification Search ........................ None
See application file for complete search history.

(56) References Cited

U.S. PATENT DOCUMENTS

| | | | |
|---|---|---|---|
| 6,154,852 | A | 11/2000 | Amundson et al. |
| 7,096,331 | B1 | 8/2006 | Haase et al. |
| 7,620,786 | B2 | 11/2009 | El-Batal et al. |
| 7,620,789 | B2 | 11/2009 | Jeddeloh |
| 2006/0242367 | A1* | 10/2006 | Ramakrishnan et al. ..... 711/152 |
| 2007/0079088 | A1* | 4/2007 | Deguchi et al. ............. 711/162 |
| 2008/0183988 | A1* | 7/2008 | Qi ............................... 711/162 |

OTHER PUBLICATIONS

Non-Final Official Action for U.S. Appl. No. 11/731,775 (Sep. 24, 2010).
Final Official Action for U.S. Appl. No. 11/731,775 (Mar. 15, 2010).
Interview Summary for U.S. Appl. No. 11/731,775 (Nov. 30, 2009).
Non-Final Official Action for U.S. Appl. No. 11/731,775 (Jul. 21, 2009).
Commonly-assigned, co-pending U.S. Appl. No. 11/731,775 for "Methods, Systems, and Computer Program Products for Parallel Processing and Saving Tracking Information for Multiple Write Requests in a Data Replication Environment Including Multiple Data Storage Devices," (Unpublished, filed Mar. 30, 2007).
"Using EMC TimeFinder/Snap with Oracle9i Databases," Engineering White Paper, EMC Corporation, pp. 1-17 (Nov. 2005).
"EMC Virtual LUN Technology, A Detailed Review," White Paper, EMC Corporation (Sep. 2006).

* cited by examiner

*Primary Examiner* — Ilwoo Park
(74) *Attorney, Agent, or Firm* — Jenkins, Wilson, Taylor & Hunt, P.A.

(57) ABSTRACT

Methods, systems, and computer program products for performing an input/output (I/O) operation that includes a virtual drain. According to one aspect, the subject matter described herein includes a method for performing an input/output operation that includes a virtual drain. The method includes receiving a request to perform a consistent operation involving a storage entity, and in response to receiving the request: arresting write requests to the storage entity; performing a virtual drain, where performing a virtual drain includes identifying, and indicating as deferred, pending writes to the storage entity; performing the consistent operation; releasing write requests to the storage entity; and processing each deferred write using information that is associated with the write and that describes the context in which the write request was accepted.

25 Claims, 2 Drawing Sheets

METHODS, SYSTEMS, AND COMPUTER PROGRAM PRODUCTS FOR PERFORMING AN INPUT/OUTPUT (I/O) OPERATION THAT INCLUDES A VIRTUAL DRAIN

TECHNICAL FIELD

The subject matter described herein relates to methods and systems for data storage, backup, and recovery. More particularly, the subject matter described herein relates to methods, systems, and computer program products for performing an input/output (I/O) operation that includes a virtual drain.

BACKGROUND

Users of data storage systems, such as storage area networks, or SANs, often desire to perform a storage operation, such as taking a "snapshot", or point-in-time copy, of the collection of data. For example, the operator of a database that tracks credit card transactions may want to take a snapshot of the database every night at midnight. The snapshot, or backup copy, may be stored as recovery data in case of system failure, for example, or it may be used as data with which to test a new version of a program and thus avoid potential corruption of production data. The location of the original data is referred to as the "copy source" or "source logical unit (LU)", and the location of the backup data is herein referred to as the "copy destination" or "destination LU", where a logical unit is a logical partition of a physical data storage device. An LU may be located on one or more physically separate storage entities, such as hard disk drives, redundant array of inexpensive disk (RAID) arrays, and the like. The collection of data to be copied is herein referred to as the "dataset". Portions of the dataset are herein referred to as "chunks".

As used herein, the term "write request" refers to the signal or message that triggers one or more write operations. The write request may be stored, in a queue for example, for later processing. Processing a write request generally means performing or attempting to perform the write operation; in some circumstances the write request may be processed multiple times (e.g., resubmitted to a queue), and/or additional write requests may be issued as a result. For example, a request to write a large data object to a storage entity may require multiple processing passes, where each pass writes only a portion of the data object to the storage entity; alternatively, the single request may be broken up into multiple smaller write requests. Since each write request represents a write operation, however, the terms "write" and "write request" are functionally synonymous, and thus are used interchangeably herein.

As used herein, the term "session" refers to the association of a copy source to a copy destination. Session information may be stored in a data structure that identifies the copy source, copy data, and other information, such as whether the session is active or inactive. A source LU may have multiple sessions associated with it, and multiple sessions may refer to the same source LU, destination LU, or both.

As used herein, the term "consistent operation" refers to an operation that partitions an I/O stream across multiple source LUs such that host I/O dependencies are maintained. That is, if I/O Request$_n$ is dependent on I/O request$_{n-1}$, then I/O Request$_n$ will only be captured by the operation if I/O Request$_{n-1}$ was also captured by the operation.

For example, to be a consistent snapshot, the snapshot needs to happen across all the LUs in the dataset before any write to any of the LUs in the dataset is acknowledged. One way to guarantee a consistent operation is to take a snapshot only while the dataset is in a quiescent state. In actual practice, taking a snapshot of a dataset only while the dataset is in a quiescent state means that before a snapshot or other consistent operation is performed, new writes to the dataset are temporarily suspended, and writes that are currently pending (also referred to as "outstanding writes") are processed. Once all pending writes have been processed, the snapshot or other copy operation is performed, after which new writes to the dataset are again allowed. Suspending new writes to the dataset or storage entity is herein referred to as "arresting" the writes, and allowing new writes to resume is herein referred to as "releasing" the writes. Processing pending writes until all pending writes have been performed is herein referred to as "draining" the writes.

This technique of "arrest, drain, perform a storage operation, and release" has disadvantages, however: during the write drain, the incoming write requests must be queued; once the write drain is complete, the storage operation has been performed, and the writes have been released, the system must then process not only the write requests that continue to come in, but also the backlog of writes that were queued from the time that the writes were arrested until the time that the writes were released. On a busy production system, a large backlog can cause huge spikes in write response time, and can greatly increase the time required to perform I/O operations. This problem may also occur during any operation which similarly requires that the dataset or the storage entity on which the dataset resides first be in a quiescent state.

Accordingly, in light of these disadvantages associated with conventional drain operations, there exists a need for a more efficient drain operation. Specifically, there exists a need for methods, systems, and computer program products for performing an input/output (I/O) operation that includes a virtual drain.

SUMMARY

The presently disclosed subject matter provides an efficient drain operation which eliminates the need to synchronously wait for pending writes to a storage entity to drain before performing a consistent operation involving the storage entity. Instead of synchronously waiting, a virtual write drain, which can complete very quickly, is performed.

According to one aspect, the subject matter described herein includes a method for performing an input/output (I/O) operation that includes a virtual drain. The method includes receiving a request to perform a consistent operation involving a storage entity, and in response to receiving the request: arresting write requests to the storage entity; performing a virtual drain, where performing a virtual drain includes identifying, and indicating as deferred, pending writes to the storage entity; performing the consistent operation; releasing write requests to the storage entity; and processing each deferred write using information that is associated with the write and that describes the context in which the write request was accepted.

According to another aspect, the subject matter described herein includes a system for performing an input/output (I/O) operation that includes a virtual drain. The system includes a write processor for receiving and accepting write requests to a storage entity, for associating each accepted write request with context information that describes the context in which the write request was accepted, and for processing each accepted write using information that is associated with the write and that describes the context in which the write request was accepted. The system also includes a queue processor for determining, maintaining, and indicating the status of received write requests, and for arresting write requests to the storage entity. The queue processor also performs a virtual drain, where performing a virtual drain includes identifying, and indicating as deferred, pending writes to the storage entity, and for indicating that the virtual drain is complete. The queue processor also releases write requests to the storage entity.

The subject matter described herein for performing an input/output (I/O) operation that includes a virtual drain may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, systems, methods, and computer program products are provided for performing an input/output (I/O) operation that includes a virtual drain. In one embodiment, a request to perform a consistent operation is received. To perform a consistent operation, incoming writes to the storage entity are arrested, a virtual drain is performed, the consistent operation is performed, and incoming write requests to the storage entity are released. To perform a virtual drain, writes that are pending at that time of the write arrest are given the classification of "deferred", and the virtual drain is indicated as being complete. In other words, the virtual drain occurs immediately and instantaneously.

The actual drain—the processing of the deferred writes—is performed asynchronously (e.g., in the background). In one embodiment, each deferred write request has associated with it information that describes the context in which the write request was accepted. This context information may include for example the status of the system, the status of the storage entity, or other information that may be used to reconstruct the context or environment at the time of acceptance of the write request. Using this context information, therefore, the deferred write requests may be processed in the context or environment that existed at the time that the write request was accepted. This may be of particular benefit for storage operations, for example, where changes to the copy source must be reflected to one or more copy destinations: by saving the context information, the synchronization between copy source and destination may, like a drain operation, be performed virtually and immediately, while the actual synchronization is performed in the background.

At the conclusion of the actual drain operation, the storage entity will contain data as if the pending writes had been drained before performing the consistent operation. Examples of consistent operations include: a consistent copy of at least a portion of the storage entity; a consistent marking of at least a portion of the storage entity for an incremental copy; an consistent incremental copy of at least a portion of the storage entity; a consistent creation of a session; a consistent split operation; a consistent periodic mirror update; a consistent asynchronous mirror update; and a consistent fracture operation.

Figure 1:
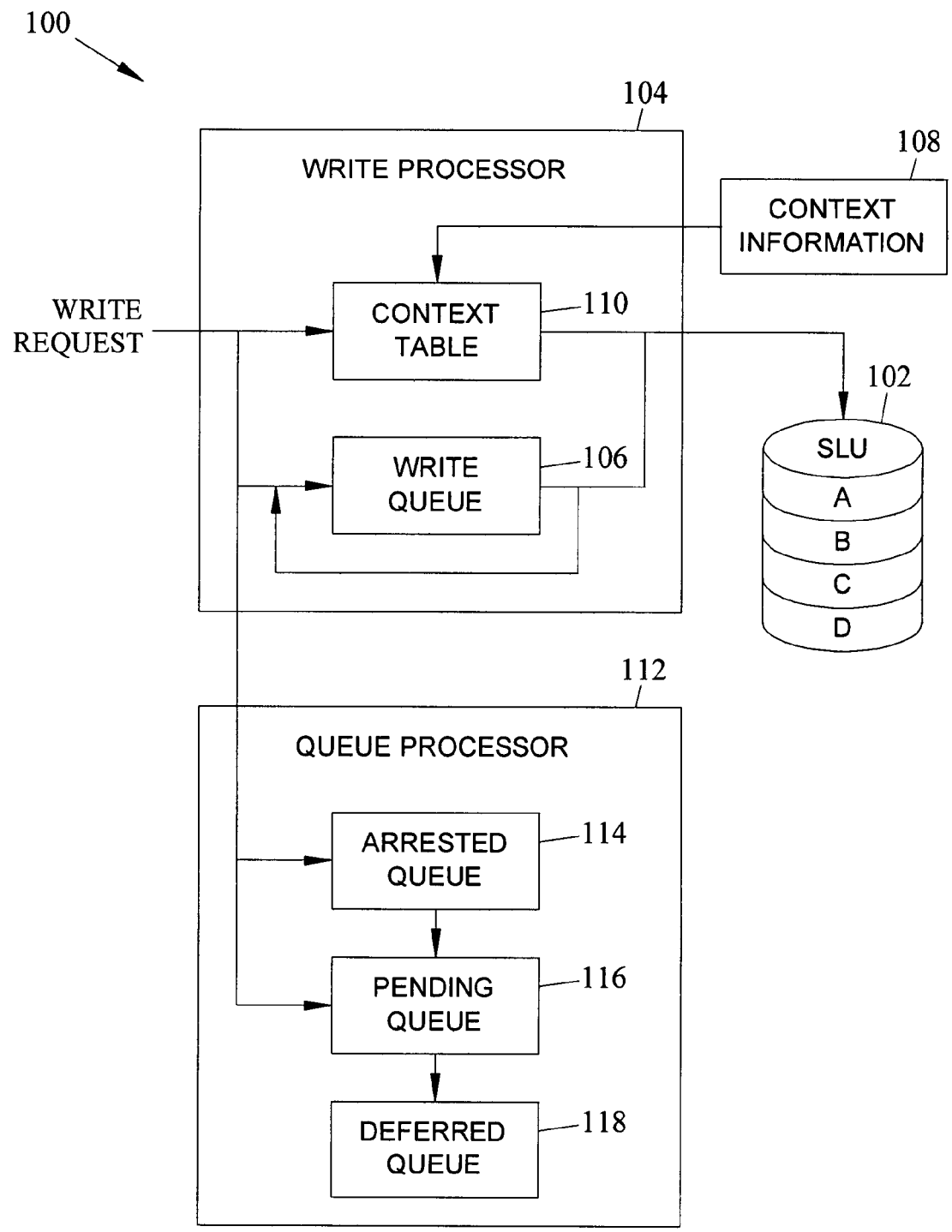
FIG. 1 is a block diagram illustrating an exemplary system for performing an input/output (I/O) operation that includes a virtual drain according to an embodiment of the subject matter described herein.

FIG. 1 is a block diagram illustrating an exemplary system for performing an input/output (I/O) operation that includes a virtual drain according to an embodiment of the subject matter described herein. In FIG. 1, system 100 for performing storage operations includes source logical unit SLU 102, a storage entity for storing all or a portion of a dataset for storing all or a portion of a dataset. SLU 102 may be a floppy disk, a hard disk, a disk array, a storage area network, a random access memory, a flash memory, another type of storage entity, or any combination of these elements. SLU 102 may be in an arrested state, in which new write requests are not accepted by SLU 102, or in a non-arrested state, in which new write requests are accepted by SLU 102. SLU 102 may be associated with a session (e.g., a copy operation) involving a destination LU, or DLU (not shown).

System 100 may include a write processor 104 for receiving write requests to write data to SLU 102. A write queue 106 may be used to hold write requests that have been received and accepted for processing. In alternative embodiments, a bit, flag, register, field of a table, or field of a database record associated with the write may be used to indicate that the write has been accepted for processing.

At the time that a write request is accepted for processing, write processor 104 may gather context information 108 and associate this information with the write request. Context information 108 may include information about sessions associated with SLU 102, information about the operational status of SLU 102, information about administrative or storage operations involving SLU 102 being performed at the time of acceptance of the write request, or other information necessary to recreate the context of the system at the time of acceptance of the write request. Associating the write with the context information could include storing context information with information identifying the write, such as the write request itself, in a table, a database, or a data structure. For example, context information 108 may be stored along with the write request in context table 110. In alternative embodiments, context information 108 may be stored in a database, or stored along with the write request in a queue.

Write processor 104 may also process the received and accepted write requests. In one embodiment, write processor 104 may retrieve a write request from write queue 106, process the write request (i.e., perform or attempt to perform the write), and then determine if the write request was fully processed. If the write was not fully processed, such as where a single write must be split into a series of separate writes, one per chunk or other logical portion, write processor 104 may place the write request back onto write queue 106 for continued processing, until the write is fully completed.

In an alternative embodiment, in addition to retrieving a write request from write queue 106, write processor 104 may also retrieve, from context table 110, context information 108 associated with that particular write. Using context information 108 associated with the write request, write processor 104 may then process or perform the write in the context of system 100 as it existed at the time of acceptance of the write request. The time of acceptance of the write request may be the time that the write request is actually received, or it may be at the time that the system determines that the write request should be allowed. For example, if a write request is received during an administrative operation, it may be desirable to postpone collecting the context information until after the administrative operation is completed. In this example, the time of acceptance could be at some time later than the time of receipt.

Referring again to the processing of the write, write processor 104 may, for example, determine from context information 108 that at the time of acceptance of the write request there existed a session that defined a storage operation between SLU 102 and a destination logical unit, or DLU (not shown), and that the storage operation defined by this session was an incremental copy operation from SLU 102 to the DLU. Using context information 108, write processor 104 can guarantee that as it processes pending or deferred write requests to SLU 102, the DLU will also be updated as necessary to maintain synchronization between SLU 102 and the DLU as required by the incremental copy operation.

System 100 may include a separate queue processor 112 for maintaining the status of each write request. In one embodiment, queue processor 112 may identify each write request as being either arrested, pending, or deferred, by placing the write request into either arrested queue 114, pending queue 116, or deferred queue 118, respectively. Alternatively, queue processor 112 may identify a write request as arrested, pending, deferred, cleared for processing, or other appropriate status, by setting a bit in a status register associated with the write request, setting a value in a field of a table entry associated with the write request, and/or setting a value in a database record associated with the write request, for example.

In one embodiment, when write processor 104 receives a write request, it may first send a copy of the write request to queue processor 112 for classification. Queue processor 112 may submit the write request to arrested queue 114 or pending queue 116, depending on whether SLU 102 is in an arrested or non-arrested state, respectively. A pending request is a write request that has been accepted but not yet processed. In some embodiments, write processor 104 may consider the write request as being accepted when queue processor 112 places the write request into pending queue 116, and write processor 104 may then submit the write request to write queue 106.

During a virtual drain, any pending write requests may be flagged as being deferred write requests. In one embodiment, a write may be identified as pending by determining that the write request is in a queue for storing pending writes. For example, the write requests that are still in pending queue 116 at the time that the virtual drain is to be performed may be identified as being pending writes. In alternative embodiments, a bit, flag, register, field of a table, or field of a database record associated with the write may be used to determine that the write is pending. In one embodiment, the pending writes may be indicated as being deferred by submitting the write to a queue for storing deferred writes. For example, the writes may be removed from pending queue 116 and transferred into deferred queue 118. In alternative embodiments, a bit, flag, register, field of a table, or field of a database record associated with the write may be used to determine that the write is deferred. In one embodiment, moving a write request from pending queue 116 to deferred queue 118 only indicates a change of status, and consequently it is not necessary to remove the copy of the write request from write queue 106. In such embodiments, the write request will remain on write queue 106 and will be processed by write processor 104 in turn.

In one embodiment, upon completion of a write request, the write request may be indicated as completed by removing the write request and its copies from all queues within system 100. In an alternative embodiment, a write request may be indicated as completed by setting a bit in a status register associated with the write request, setting a value in a field of a table entry associated with the write request, setting a value in a database record associated with the write request, or removing a table entry or database record associated with the write request, for example.

In alternative embodiments, the functions of write processor 104 and queue processor 112 may be performed by one entity or may be distributed across multiple entities.

Figure 2:
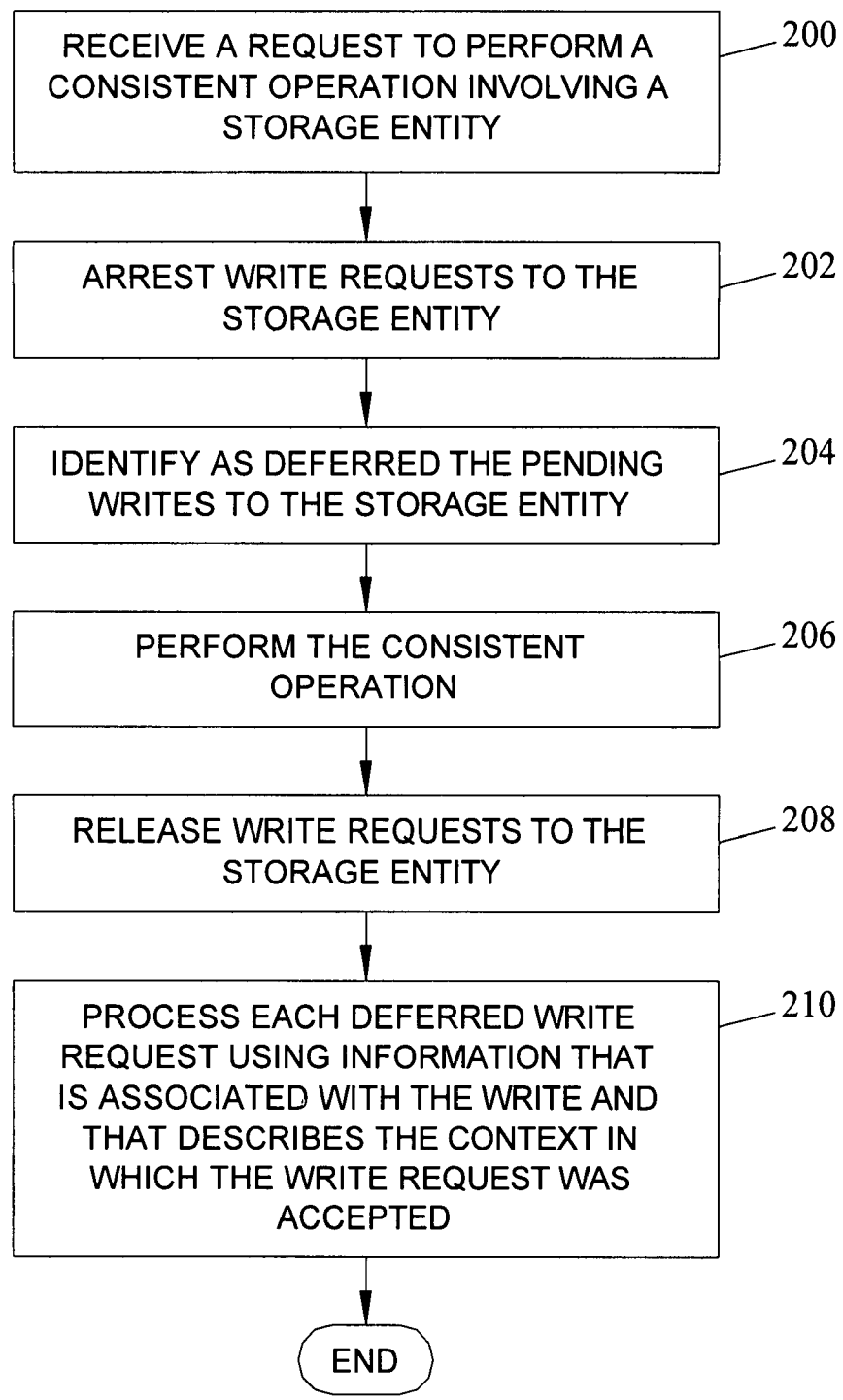
FIG. 2 is a flow chart illustrating an exemplary process for performing an input/output (I/O) operation that includes a virtual drain according to an embodiment of the subject matter described herein.

FIG. 2 is a flow chart illustrating an exemplary process for performing an input/output (I/O) operation that includes a virtual drain according to an embodiment of the subject matter described herein. The operation will be described in reference to FIGS. 1 and 2.

In block 200, a request for performing an input/output (I/O) operation that includes a virtual drain is received. For example, system 100 may receive a request to perform a consistent operation involving a storage entity, such as a request for a consistent snapshot of SLU 102.

In block 202, write requests to the storage entity SLU 102 are arrested. Arresting write requests may involve preventing new write requests from being processed, and it may involve storing the new write requests for later processing. For example, prior to the arrest, write requests to SLU 102 may be placed in pending queue 116; while SLU 102 is in an arrested state, however, new write requests received by queue processor 112 may be sent to arrested queue 114 rather than to pending queue 116. In alternative embodiments, new write requests may be stored in another queue, in a table, or in a database, for example. By placing incoming write requests into arrested queue 114, the write requests are stored during the operation of the virtual drain, to be processed later, when the write requests to SLU 102 are released. In one embodiment, since write requests are not going to pending queue 116, neither will they be submitted to write queue 106; only when and if the write request is placed into pending queue 116 will it also be sent to write queue 106.

In block 204, a virtual drain is performed. Performing the virtual drain involves identifying writes to the storage entity that are still pending and indicating them as deferred. In FIG. 1, write requests that are in pending queue 116 are moved from pending queue 116 into deferred queue 118. From the viewpoint of system 100, the virtual drain happens very quickly, so that the process can quickly move to block 206, in which the consistent operation, such as taking a consistent snapshot of SLU 102, is performed.

In block 208, write requests to the storage entity are released. Releasing write requests to the storage entity may involve allowing new write requests to be processed, and it may involve submitting previously arrested and stored write requests for processing. For example, queue processor 112 may remove write requests from arrested queue 114 and transfer them into pending queue 116 for processing by write processor 104. In some embodiments, write requests that are first sent to arrested queue 114 are not also sent to write queue 106; in those embodiments, a copy of the write request may be sent to write queue 106 only when the request is transferred from arrested queue 114 to pending queue 116. Because the write requests are released relatively quickly after the write requests are arrested, the backlog of arrested write requests may contain fewer write requests than it would have had the intervening drain operation taken more time.

Although the virtual drain is completed, the actual drain will not be complete until all deferred write requests have been processed. Thus, in block 210, the deferred writes are processed using information that is associated with the write and that describes the context in which the write request was accepted. In one embodiment, deferred writes are identified by the presence of their respective write requests in deferred queue 118. In alternate embodiments, a bit, flag, register, field of a table, or field of a database record associated with the writes may be used to identify deferred writes.

In one embodiment, the context information associated with the write is retrieved. For example, write processor 104 may use an identifier that uniquely identifies the particular write request as an index into context table 110, and read from context table 110 context information 108 associated with that write request. In alternative embodiments, the context information may be read from other storage locations, such as a table, a database, a queue, etc. In embodiments that do not associate context information with each write, context information 108 is not associated with each write at the time of the acceptance of the write request, and consequently no context information is retrieved, for example from context table 110, at the time of processing of the write request.

As an illustrative example, assume that write processor 104 determines from context information 108 associated with a particular write that at the time that the write request was accepted, SLU 102 included an active snapshot session, which dictates that old data on SLU 102 must be protected by a COFW operation before being overwritten with new data; in this case, in order to perform the write in the context in which the write request was accepted, write processor 104 must perform the COFW protection step before performing the write operation.

In one embodiment, processing a write includes performing the write and then determining whether all of the data associated with the write has been written to the storage entity, and if not, re-submitting the write to (or letting it remain in) the appropriate queue. For example, write processor 104 may process a deferred write that involves multiple physical writes; e.g., data that spans LUs or data that is too large to write to a single LU in a single write operation. In this scenario, if write processor 104 performs the write, but determines that not all of the data has been written yet, write processor 104 may either re-submit the write to write queue 106 or simply leave the write request in deferred queue 118, to indicate that there is still a deferred write to be processed.

When a write is completed, it may be indicated as being complete, for example, by removing the write request from all queues, e.g., from write queue 106 and deferred queue 118.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for performing an input/output (I/O) operation that includes a virtual drain, the method comprising:
   (a) receiving a request to perform an I/O operation involving the copying of data from a source storage entity to a destination storage entity; and
   (b) in response to receiving the I/O request:
      (i) arresting write requests to the source storage entity by preventing write requests from being placed into a write queue for storing write requests to the source storage entity;
      (ii) performing a virtual drain, wherein performing a virtual drain includes identifying, and indicating as deferred, pending writes to the source storage entity, wherein a pending write comprises a write request that exists in the write queue and has not yet been processed and wherein a deferred write comprises a write request which is processed after performing the I/O operation and which is processed in the context in which the deferred write was accepted;
      (iii) performing the I/O operation, and after performing the I/O operation:
         (a) releasing write requests to the source storage entity by allowing write requests to be placed into the write queue; and
         (b) processing each deferred write request using context information that is associated with the deferred write request and that describes the context in which the deferred write request was accepted, wherein the context information comprises at least one of a status of the source storage entity at the time that the deferred write request was accepted and a configuration of the source storage entity at the time that the deferred write request was accepted.

2. The method of claim 1 wherein the I/O operation involving the source and destination storage entities comprises a consistent operation wherein dependencies of I/O requests that are received by the source storage entity during the time that the I/O operation involving the source and destination storage entities is being performed are maintained.

3. The method of claim 2 wherein the consistent operation comprises at least one of:
   (a) a consistent copy of at least a portion of the source storage entity to the destination storage entity;
   (b) a consistent marking of at least a portion of the source storage entity for an incremental copy to the destination storage entity;
   (c) a consistent incremental copy of at least a portion of the source storage entity to the destination storage entity;
   (d) a consistent creation of a session associating the source storage entity to the destination storage entity;
   (e) a consistent split operation;
   (f) a consistent periodic mirror update; and
   (g) a consistent fracture operation.

4. The method of claim 1 wherein the source storage entity comprises at least one of a floppy disk, a hard disk, a disk array, a storage area network, a random access memory, and a flash memory.

5. The method of claim 1 wherein arresting write requests to the source storage entity comprises one of:
   (a) preventing new write requests from being processed; and
   (b) storing, in a location separate from the write queue for storing write requests to the source storage entity, new write requests for later processing.

6. The method of claim 3 wherein storing, in a location separate from the write queue for storing write requests to the source storage entity, new write requests for later processing comprises one of:
   (a) storing new write requests in a queue;
   (b) storing new write requests in a table; and
   (c) storing new write requests in a database.

7. The method of claim 1 wherein identifying the pending writes comprises, for each of the pending writes, one of:
   (a) determining that the write is in a queue for storing pending writes; and
   (b) reading information that is associated with the write and that indicates that the write is pending, wherein the information is stored in one of a table, a database, and a data structure.

8. The method of claim 1 wherein indicating the pending writes as deferred comprises, for each of the pending writes, one of:
   (a) submitting the write to a queue for storing deferred writes; and
   (b) associating the write with information indicating that the write is deferred.

9. The method of claim 8 wherein the information indicating that the write is deferred is stored in one of a table, a database, and a data structure.

10. The method of claim 1 wherein releasing write requests to the source storage entity comprises one of:
    (a) allowing new write requests to be processed; and
    (b) submitting previously arrested and stored write requests for processing.

11. The method of claim 1 wherein processing each deferred write comprises, for each write, performing the deferred write, determining whether all of the data associated with the write has been written to the source storage entity, and upon determination that not all of the data has been written to the source storage entity, submitting the write for further processing.

12. The method of claim 1 comprising receiving one or more write requests for performing writes to the source storage entity, and for each write request:
    (a) associating the write with context information that describes the context in which the write request was accepted;
    (b) indicating that the write is pending; and
    (c) submitting the write for processing.

13. The method of claim 12 wherein associating the write with context information that describes the context in which the write request was accepted comprises storing the information in one of a table, a database, a data structure, and a memory.

14. The method of claim 12 wherein indicating that the write is pending comprises one of:
    (a) submitting the write to a queue for storing pending writes; and
    (b) associating the write with information indicating that the write is deferred.

15. The method of claim 14 wherein the information indicating that the write is deferred is stored in one of a table, a database, and a data structure.

16. The method of claim 12 wherein submitting the write for processing comprises submitting the write request to a queue for storing write requests for processing.

17. The method of claim 1 wherein the context information includes at least one of:
    (a) information about sessions associated with the source storage entity;
    (b) information about the operational status of the source storage entity; and
    (c) information about operations involving the source storage entity being performed at the time of acceptance of the write request.

18. A system for performing an input/output (I/O) operation that includes a virtual drain, the system comprising:
    (a) a write processor for:
       (i) receiving and accepting write requests to a source storage entity for which a request for an I/O operation involving the copying of data from the source storage entity to a destination storage entity has been received;
       (ii) associating each accepted write request with context information that describes the context in which the write request was accepted, wherein the context information comprises at least one a status of the source storage entity at the time that the write request was accepted and a configuration of the source storage entity at the time that the write request was accepted; and
    (b) a queue processor for:
       (i) determining, maintaining, and indicating the status of received write requests;
       (ii) arresting write requests to the source storage entity for which the request for performing the I/O operation involving copying of data from the source storage entity to the destination storage entity has been received by preventing write requests from being placed into a write queue for storing write requests to the source storage entity; and
       (iii) performing a virtual drain, wherein performing the virtual drain includes identifying, and indicating as deferred, pending writes to the source storage entity, and for indicating that the virtual drain is complete, wherein a pending write is a write request that exists in the write queue and has not yet been processed and wherein a deferred write comprises a write request which is processed after performing the I/O operation and which is processed in the context in which the deferred write was accepted, and wherein, after the virtual drain is indicated as being complete, the write processor performs the I/O operation;
    wherein, after the I/O operation is performed, the queue processor releases write requests to the source storage entity by allowing write requests to be placed into the write queue and the write processor processes the deferred write requests using the context information.

19. The system of claim 18 comprising one of a write queue, a table, a database, a data structure, and a memory location for storing accepted write requests.

20. The system of claim 18 comprising a context table for storing the context information associated with each write.

21. The system of claim 18 comprising one of an arrested queue, a table, a database, a data structure, and a memory location for storing arrested write requests to the source storage entity and for identifying a write as arrested.

22. The system of claim 18 comprising one of a pending queue, a table, a database, a data structure, and a memory location for storing write requests for pending writes to the source storage entity and for identifying a write as pending.

23. The system of claim 18 comprising one of a deferred queue, a table, a database, a data structure, and a memory location for storing write requests for deferred writes to the source storage entity and for identifying a write as deferred.

24. The system of claim 18 wherein the source storage entity comprises at least one of a floppy disk, a hard disk, a disk array, a storage area network, a random access memory, and a flash memory.

25. A computer program product comprising computer executable instructions embodied in a computer readable medium for performing a virtual drain, the steps comprising:

(a) receiving a request to perform an input/output (I/O) operation involving copying of data from a source storage entity to a destination storage entity; and
(b) in response to receiving the I/O request:
   (i) arresting write requests to the source storage entity by preventing write requests from being placed into a write queue for storing write requests to the source storage entity;
   (ii) performing a virtual drain, wherein performing a virtual drain includes identifying, and indicating as deferred, pending writes to the source storage entity, wherein a pending write is a write request that exists in the write queue and has not yet been processed and wherein a deferred write comprises a write request which is processed after performing the I/O operation and which is processed in the context in which the deferred write was accepted;
   (iii) performing the I/O operation, and after performing the I/O operation:
(a) releasing write requests to the source storage entity by allowing write requests to be placed into the write queue; and
(b) processing each deferred write request using context information that is associated with the deferred write request and that describes the context in which the deferred write request was accepted, wherein the context information comprises at least one of a status of the source storage entity at the time that the deferred write request was accepted and a configuration of the source storage entity at the time that the deferred write request was accepted.

* * * * *